(12) United States Patent
Stimm et al.

(10) Patent No.: US 11,622,076 B2
(45) Date of Patent: *Apr. 4, 2023

(54) SYSTEMS AND METHODS FOR STABILIZING VIDEOS

(71) Applicant: GoPro, Inc., San Mateo, CA (US)

(72) Inventors: Daryl Stimm, Encinitas, CA (US); Kyler William Schwartz, Valley Center, CA (US); Peter Tran, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,065

(22) Filed: Apr. 14, 2022

(65) Prior Publication Data

US 2022/0239833 A1 Jul. 28, 2022

Related U.S. Application Data

(63) Continuation of application No. 17/151,917, filed on Jan. 19, 2021, now Pat. No. 11,310,425, which is a continuation of application No. 16/418,081, filed on May 21, 2019, now Pat. No. 10,917,573.

(51) Int. Cl.
*H04N 5/232* (2006.01)
*H04N 21/431* (2011.01)

(52) U.S. Cl.
CPC ..... *H04N 5/23274* (2013.01); *H04N 5/23251* (2013.01); *H04N 5/23254* (2013.01); *H04N 5/23258* (2013.01); *H04N 5/23267* (2013.01); *H04N 21/4312* (2013.01)

(58) Field of Classification Search
CPC .......... H04N 5/23251; H04N 5/23254; H04N 5/23258; H04N 5/23264; H04N 5/23267; H04N 5/23274; H04N 21/4312
See application file for complete search history.

(56) References Cited

U.S. PATENT DOCUMENTS

| | | | | |
|---|---|---|---|---|
| 9,927,368 | B1* | 3/2018 | Olsson | G01N 21/8803 |
| 10,917,573 | B1* | 2/2021 | Stimm | H04N 5/23258 |
| 11,310,425 | B2* | 4/2022 | Stimm | H04N 5/23254 |
| 2004/0189864 | A1 | 9/2004 | Topper | |
| 2011/0149094 | A1* | 6/2011 | Chen | H04N 5/23261 |
| | | | | 348/E5.022 |
| 2013/0182134 | A1* | 7/2013 | Grundmann | H04N 5/23254 |
| | | | | 348/208.6 |
| 2015/0350548 | A1 | 12/2015 | Beysserie | |
| 2016/0219223 | A1* | 7/2016 | Eline | A63H 30/04 |
| 2017/0289454 | A1* | 10/2017 | Pettersson | H04N 5/23267 |

* cited by examiner

*Primary Examiner* — Lin Ye
*Assistant Examiner* — Chriss S Yoder, III
(74) *Attorney, Agent, or Firm* — Esplin & Associates, PC

(57) ABSTRACT

A video may be captured by an image capture device in motion. A stabilized view of the video may be generated by providing a punchout of the video. The punchout of the video may compensate for rotation of the image capture device during capture of the video. The size of the punchout of the video may be changed based on different rotational positions of to provide a view that includes different extents of the captured visual content. The changes in the size of the punchout may simulate changes in zoom of the visual content.

20 Claims, 7 Drawing Sheets

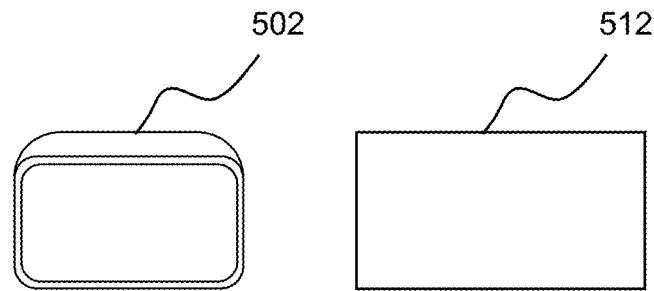
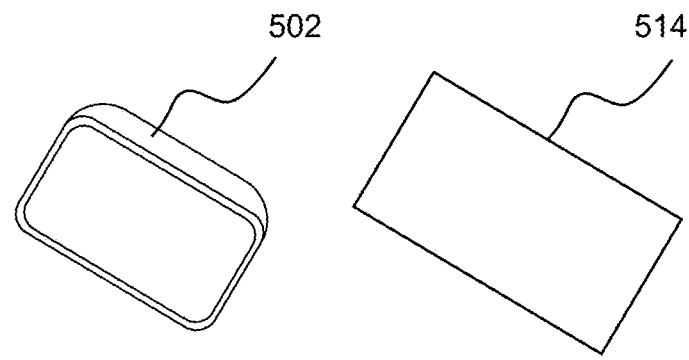
FIG. 5A
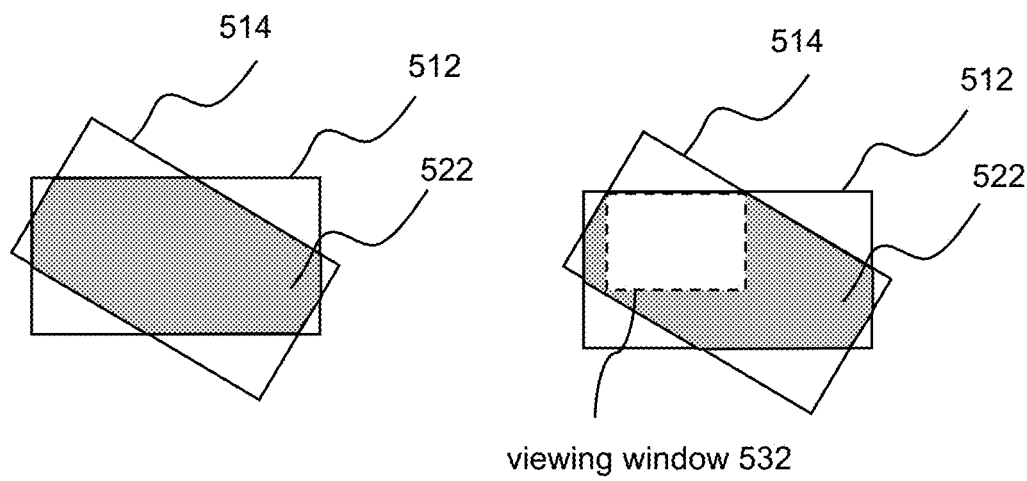
FIG. 5B  FIG. 5C

SYSTEMS AND METHODS FOR STABILIZING VIDEOS

FIELD

This disclosure relates to stabilizing videos based on dynamic field of view adjustment.

BACKGROUND

A video may have been captured by an image capture device in motion. The motion of the image capture device during the capture of the video may cause the video to appear jerky/shaky.

SUMMARY

This disclosure relates to stabilizing videos. Video information, rotational position information, and/or other information may be obtained. The video information may define a video. The video may include video content captured by an image capture device during a capture duration. The video content may have a progress length. The video content may include visual content captured at different moments within the capture duration. The visual content may be viewable as a function of progress through the progress length. The visual content may have a field of view. The rotational position information may characterize rotational positions of the image capture device as a function of progress through the capture duration. A viewing window for the visual content as a function of progress through the progress length may be determined based on the rotational positions of the image capture device as the function of progress through the capture duration and/or other information. The viewing window may define extents of the visual content to be included within stabilized visual content as the function of progress through the progress length. Determination of the viewing window may include determination of sizes of the viewing window as the function of progress through the progress length based on the rotational positions of the image capture device as the function of progress through the capture duration and/or other information. The stabilized visual content may be generated based on the viewing window and/or other information. The stabilized visual content may include a punchout of the extents of the visual content within the viewing window.

A system that stabilizes videos may include one or more electronic storages, one or more processors, and/or other components. An electronic storage may store video information defining a video, information relating to the video, information relating to video content, information relating to visual content, information relating to an image capture device, information relating to a capture duration, rotational position information of the image capture device, information relating to rotational positions of the image capture device, information relating to a viewing window, information relating to sizes of the viewing window, information relating to movement of the viewing window, information relating to stabilized visual content, information relating to a punchout of visual content, and/or other information. In some implementations, the system may include one or more optical elements, one or more image sensors, one or more position sensors, and/or other components.

One or more components of the system may be carried by a housing, such as a housing of an image capture device. For example, the optical element(s), the image sensor(s), and/or the position sensor(s) of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate stabilizing videos. The machine-readable instructions may include one or more computer program components. The computer program components may include one or more of a video information component, a position information component, a viewing window component, a generation component, and/or other computer program components.

The video information component may be configured to obtain video information and/or other information. Video information may define a video. The video may include video content captured by an image capture device during a capture duration. The video content may have a progress length. The video content may include visual content captured at different moments within the capture duration. The visual content may be viewable as a function of progress through the progress length. The visual content may have a field of view.

The position information component may be configured to obtain rotational position information of the image capture device and/or other information. The rotational position information may characterize rotational positions of the image capture device as a function of progress through the capture duration.

The viewing window component may be configured to determine a viewing window for the visual content as a function of progress through the progress length based on the rotational positions of the image capture device as the function of progress through the capture duration and/or other information. The viewing window may define extents of the visual content to be included within stabilized visual content as the function of progress through the progress length. Determination of the viewing window may include determination of sizes of the viewing window as the function of progress through the progress length based on the rotational positions of the image capture device as the function of progress through the capture duration and/or other information.

In some implementations, changes in the sizes of the viewing window as the function of progress through the progress length may simulate changes in zoom of the visual content. In some implementations, the viewing window may be determined to have a minimum of the sizes of the viewing window over the progress length. In some implementations, the viewing window may be determined to have the sizes as the function of progress through the progress length. In some implementations, the viewing window may be determined to have smoothed changes in the sizes as the function of progress through the progress length.

In some implementations, the determination of the viewing window may include determination of maximum extents of the visual content for placement of the viewing window as the function of progress through the progress length based on the rotational positions of the image capture device as the function of progress through the capture duration and/or other information. In some implementations, the sizes of the viewing window may be smaller than the maximum extents of the visual content, and the viewing window may move within the maximum extents of the visual content to generate one or more panning views.

In some implementation, the viewing window component may be further configured to rotate the visual content to level the visual content as the function of progress through the progress length based on the rotational positions of the image capture device as the function of progress through the capture duration and/or other information. The rotation of the visual content may be effectuated through rotation of the visual content itself and/or through orientation of the viewing window with respect to the field of view of the visual content.

The generation component may be configured to generate the stabilized visual content based on the viewing window and/or other information. The stabilized visual content may include a punchout of the extents of the visual content within the viewing window. In some implementations, the stabilized visual content may be generated as a director track that defines the extents of the visual content to be used during playback.

In some implementations, the stabilized visual content may be generated based on the viewing window having the minimum of the sizes of the viewing window over the progress length and/or other information. In some implementations, the stabilized visual content may be generated based on the viewing window having the sizes as the function of progress through the progress length and/or other information. In some implementations, the stabilized visual content may be generated based on the viewing window having smoothed changes in the sizes as the function of progress through the progress length and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 5A illustrates example images captured by an image capture device from different rotational positions.

FIG. 5B illustrates an example overlapping portion between the images shown in FIG. 5A.

FIG. 5C illustrates an example viewing window within the overlapping portion shown in FIG. 5B.

DETAILED DESCRIPTION

Figure 1:
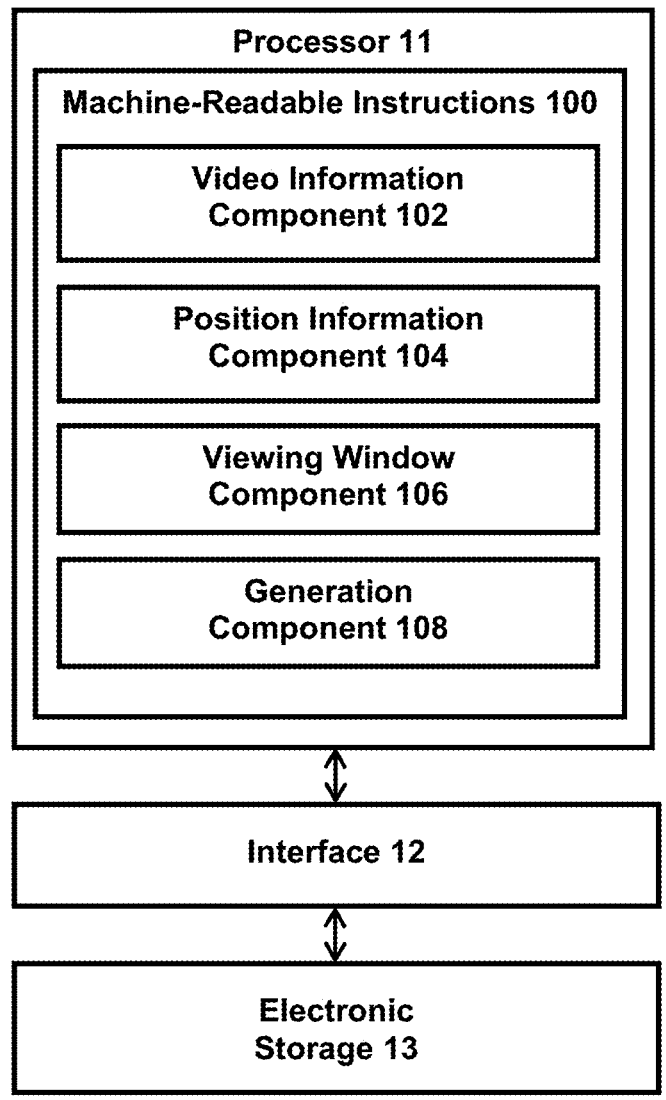
FIG. 1 illustrates an example system that stabilizes videos.

FIG. 1 illustrates a system 10 for stabilizing videos. The system 10 may include one or more of a processor 11, an interface 12 (e.g., bus, wireless interface), an electronic storage 13, and/or other components. In some implementations, the system 10 may include one or more optical elements, one or more image sensors, one or more position sensors, and/or other components. Video information, rotational position information, and/or other information may be obtained by the processor. The video information may define a video. The video may include video content captured by an image capture device during a capture duration. The video content may have a progress length. The video content may include visual content captured at different moments within the capture duration. The visual content may be viewable as a function of progress through the progress length. The visual content may have a field of view. The rotational position information may characterize rotational positions of the image capture device as a function of progress through the capture duration.

A viewing window for the visual content as a function of progress through the progress length may be determined based on the rotational positions of the image capture device as the function of progress through the capture duration and/or other information. The viewing window may define extents of the visual content to be included within stabilized visual content as the function of progress through the progress length. Determination of the viewing window may include determination of sizes of the viewing window as the function of progress through the progress length based on the rotational positions of the image capture device as the function of progress through the capture duration and/or other information. The stabilized visual content may be generated based on the viewing window and/or other information. The stabilized visual content may include a punchout of the extents of the visual content within the viewing window.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information defining a video, information relating to the video, information relating to video content, information relating to visual content, information relating to an image capture device, information relating to a capture duration, rotational position information of the image capture device, information relating to rotational positions of the image capture device, information relating to a viewing window, information relating to sizes of the viewing window, information relating to movement of the viewing window, information relating to stabilized visual content, information relating to a punchout of visual content, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate stabilizing videos. The machine-readable instructions 100 may include one or more computer program components. The machine-readable instructions 100 may include one or more of a video information component 102, a position information component 104, a viewing window component 106, a generation component 108, and/or other computer program components.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or position sensor(s) of the system 10 may be carried by the housing of the image capture device. The housing may carry other components, such as the processor 11 and/or the electronic storage 13. References to a housing of an image capture device may refer to the image capture device, and vice versa. For example, references to position/motion of a housing of an image capture device may refer to position/motion of the image capture device, and vice versa.

Figure 3:
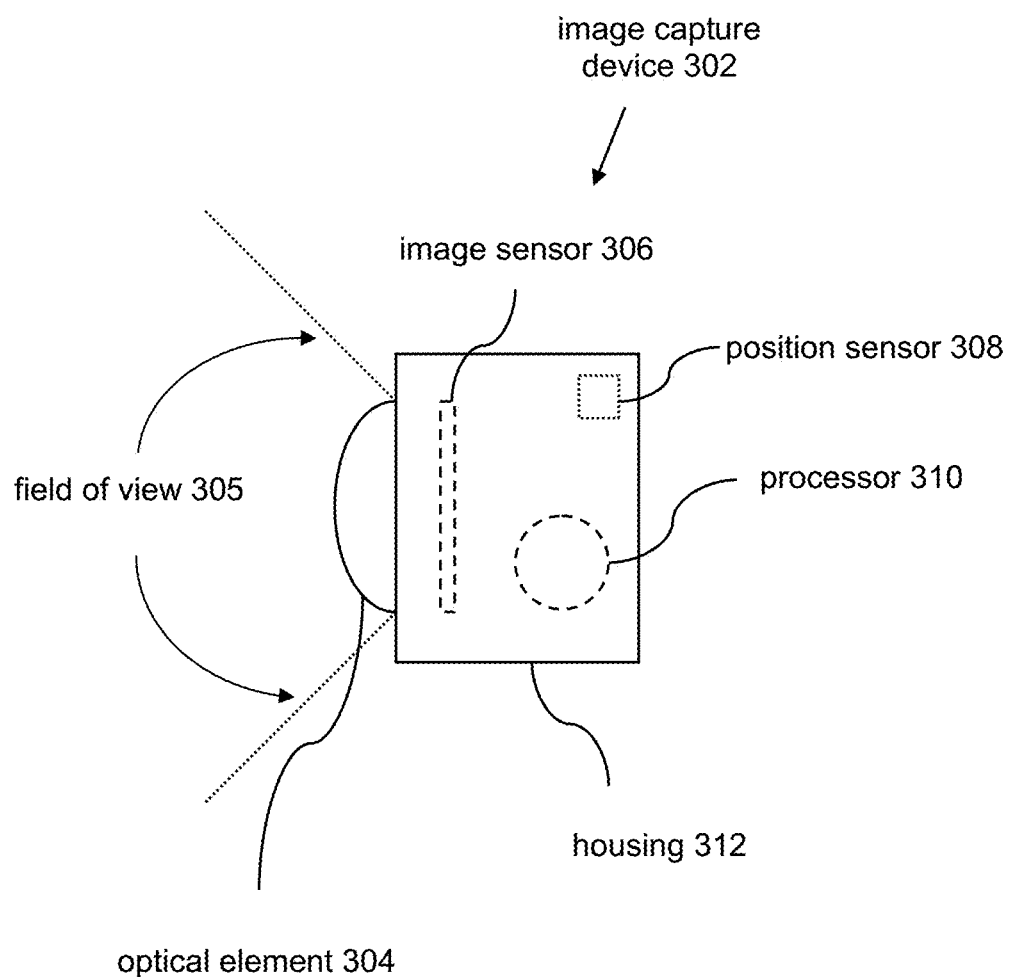
FIG. 3 illustrates an example image capture device.

An image capture device may refer to a device for recording visual information in the form of images, videos, and/or other media. An image capture device may be a standalone device (e.g., camera) or may be part of another device (e.g., part of a smartphone, tablet). FIG. 3 illustrates an example image capture device 302. The image capture device 302 may include a housing 312, and the housing 312 may carry (be attached to, support, hold, and/or otherwise carry) an optical element 304, an image sensor 306, a position sensor 308, a processor 310, and/or other components. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306. The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

The field of view 305 may be larger than a size of the punchout/viewing window used to generate stabilized visual content. Portions of the visual content captured from light within the field of view 305 may be presented on a display and/or used to generate a video. The portions of the visual content presented on the display/used to generate a video may include those portions of the visual content within a viewing window. A viewing window may define extents of the visual content (e.g., of image(s)/video frame(s)) to be included within a punchout. The viewing window may be determined so that the visual content within the presentation/generated video does not appear shaky/jerky or appears less shaky/jerky. For example, the shape, size, and/or the location of the viewing window within the visual content may be determined to compensate for motion of the image capture device 302 during capture such that the video appears to have been captured from an image capture device 302 with less motion. That is, the visual content captured by the image capture device 302 may be cropped to generate stabilized visual content.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines visual content of one or more images and/or one or more video frames of a video. For example, the image sensor 306 may be configured to generate a visual output signal based on light that becomes incident thereon during a capture duration. The visual output signal may convey visual information that defines visual content having the field of view.

The position sensor 308 may include sensor(s) that measures experienced positions and/or motions. The position sensor 308 may convert experienced positions and/or motions into output signals. The output signals may include electrical signals. For example, the position sensor 308 may refer to a set of position sensors, which may include one or more inertial measurement units, one or more accelerometers, one or more gyroscopes, and/or other position sensors. The position sensor 308 may generate output signals conveying information that characterizes positions and/or motions of the position sensor 308 and/or device(s) carrying the position sensor 308, such as the image capture device 302 and/or the housing 312.

For example, the position sensor 308 may be configured to generate a position output signal based on positions of the image capture device 302 during the capture duration. The position output signal may convey position information that characterizes positions of the image capture device 302 at different moments (points in time, time durations) within the capture duration. The position information may characterize positions of the image capture device 302 based on specific translational and/or rotational positions of the image capture device 302 and/or based on changes in translational and/or rotational positions of the image capture device 302 as a function of progress through the capture duration. That is, the position information may characterize translational and/or rotational positions of the image capture device 302 and/or changes in translational and/or rotational positions (motion) of the image capture device 302 (e.g., direction, amount, velocity, acceleration) during the capture duration.

The position information may be determined based on signals generated by the position sensor 308 and independent of the information/signals generated by the image sensor 306. That is, position information may be determined without using visual content/images/videos generated by the image sensor 306. Use of visual content/images/videos to determine positions/motions of the image capture device 302 may be computationally expensive in terms of processing power, processing time, and/or battery consumption. Using the information/signals from the position sensor 308 to determine positions/motions of image capture device 302 may be computationally cheaper. That is, less processing power, processing time, and/or battery consumption may be required when positions/motions of the image capture device 302 are determined from the information/signals from the position sensor 308 than the information/signals from the image sensor 306. The position information determined independent of the image information may be used to determine the positions of the image capture device 302 during the capture duration.

In some implementations, the position information may include data from the position sensor (e.g., gyroscope data, accelerometer data) with time stamps per visual content capture at different moments. For example, the position may include gyroscope data and/or accelerometer data per individual video frames captured by the image capture device. In some implementations, calibration of an inertial measurement unit may be used to combine different data within the position information.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the position sensor 308, and/or facilitate transfer of information from the image sensor 306 and/or the position sensor 308 to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

For example, the processor 310 may use the position information to stabilize visual content captured through the optical element 304 and/or the image sensor 306. Visual content having a field of view may be captured by the image capture device 302 during a capture duration. The processor 310 may determine the rotational positions of the image capture device as a function of progress through the capture duration and use the rotational positions of the image capture device to determine placement of the viewing window within the field of view of the visual content. The placement of the viewing window within the field of view of the visual content may include one or more of changing the size of the viewing window, changing the shape of the viewing window, and/or changing the location of the viewing window within the field of view based on the rotational positions of the image capture device. The visual content within the viewing window may be used (e.g., cropped) to generate stabilized visual content. For example, the size of the viewing window may be increased and/or decreased based on the rotational positions of the image capture device as a function of progress through the capture duration and different sizes of extents of the visual content may be cropped to stabilize the visual content.

Stabilization of visual content may be performed based on placement of the viewing window within the field of view of the visual content. The placement of the viewing window may compensate for the motion of the image capture device during the capture duration. For example, a viewing window having a smaller size than the field of view of the visual content may be used to provide a punchout of the visual content. The punchout (cropped view) may be moved within the field of view to provide a stabilized view of the visual content.

The viewing window may be oriented with respect to the field of view of the visual content to provide a punchout of the visual content that is stable with respect to prior and/or next punchout of the visual content. For example, the viewing window may be oriented with respect to the field of view of images/video frames captured by the image capture device to provide a punchout of the images/video frames such that the presented content appears to have been captured with a stable/more stable image capture device (e.g., a punchout of a video frame being stable/more stable with a punchout of the preceding video frame and/or a subsequent video frame).

Figure 4:
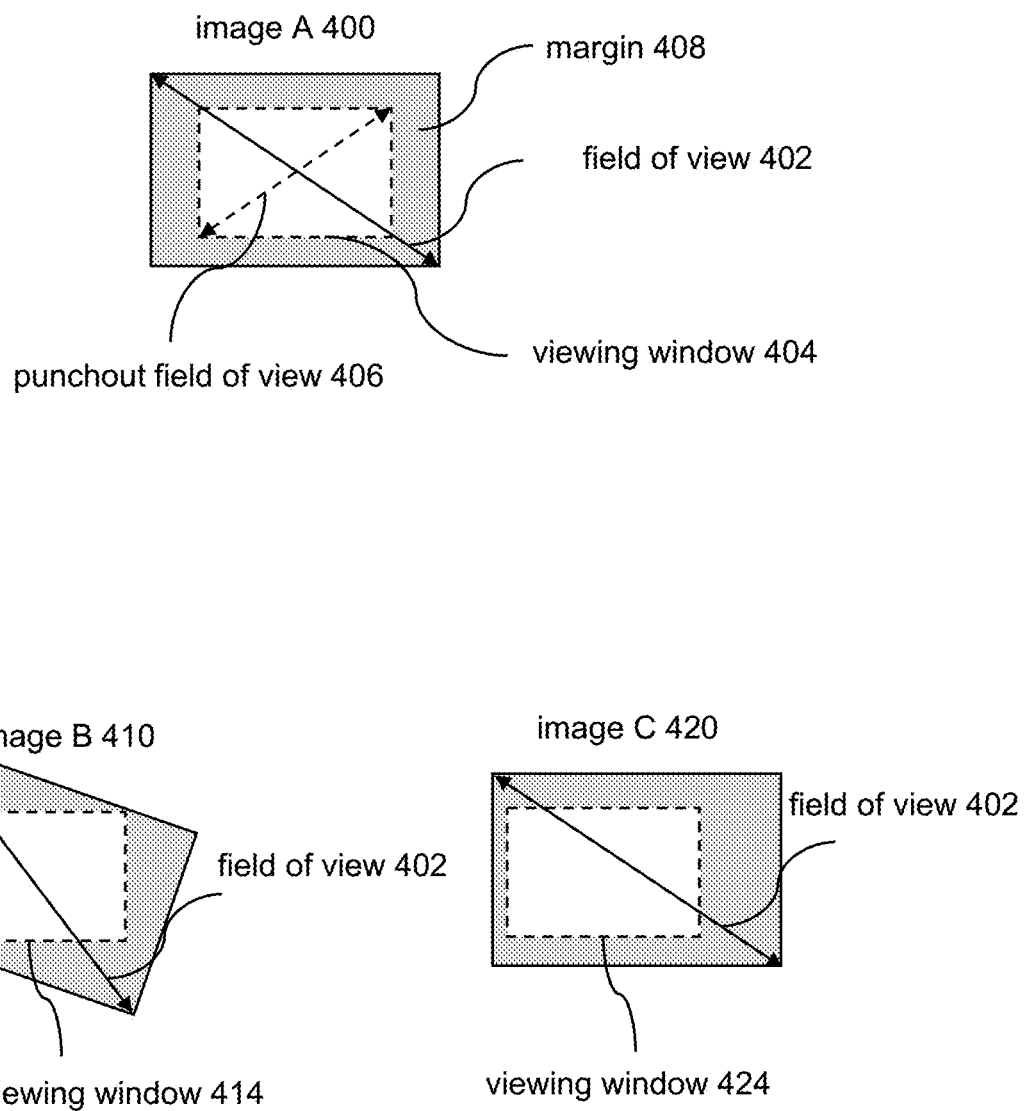
FIG. 4 illustrates example orientations of viewing windows with respect to images.

For example, FIG. 4 example orientations of viewing windows 404, 414, 424 with respect to images 400, 410, 420. The images 400, 410, 420 may have a field of view 402. The viewing windows 404, 414, 424 may have a punchout field of view 406. The images 400, 410, 420 may include capture of a scene within an angle defined by the field of view 402. The viewing windows 404, 414, 424 may provide a punchout of the images 400, 410, 420 to be used for video stabilization. The punchout field of view 406 of the viewing windows 404, 414, 424 may be smaller than the field of view 402 of the images 400, 410, 420. The difference between the field of view 402 and the punchout field of view 406 may define a margin 408 within which the viewing window 404 may move with respect to the image A 400/field of view 402. The margin 408 may specify how much the viewing window 404 may move while remaining inside the field of view 402 of the visual content included within the image A 402.

Placements of the viewing window 404, 414, 424 within the field of view 402 (orientation of the viewing window 404 with respect to the field of view 402) may be changed to perform video stabilization. For example, the viewing window 414 may be rotated with respect to the field of view 402 of the image B 610 while not going beyond the pixels captured within the image B 610. The viewing window 424 may be laterally moved with respect to the field of view 402 of the image C 420 while not going beyond the pixels captured within the image C 420. The placements of the viewing window 404, 414, 424 may be determined based on the rotational positions of the image capture device when the images 400, 410, 420 were captured.

For instance, the viewing window 414 may be oriented with respect to the field of view 402 of the image B 610 to provide a punchout of the image B 610 that is stable with respect to a prior and/or next punchout of the images (e.g., stable with the punchout of the image A 400 using the viewing window 404 for the image A 400). The orientation of the viewing window 414 with respect to the field of view 402 of the image B 610 may be determined based on the rotational position of the image capture device from which the image B 610 was captured. Similarly, the viewing window 424 may be oriented with respect to the field of view 402 of the image C 420 to provide a punchout of the image C 420 that is stable with respect to a prior and/or next punchout of the images (e.g., stable with the punchout of the image B 410 using the viewing window 414 for the image B 410).

Smaller sizes of the punchout/viewing window (e.g., smaller punchout field of view) may enable greater stabilization of motion within the visual content caused by the motion of the image capture device. Using a smaller punchout/viewing window may enable the punchout to be moved to greater extent before the punchout hits an edge of the visual content. However, smaller punchout/viewing window may provide a smaller view (smaller portion) of the visual content.

The size of the punchout/viewing window may be dynamically changed based on the rotational positions of the image capture device. For example, motion (e.g., shake, jitter, jerk) of the visual content may be estimated based on readings from the position sensor of the image capture device. The rotational positions of the image capture device as the function of progress through the capture duration may be used to determine/estimate how much motion is within the visual content due to motion of the image capture device (e.g., shaking/vibration of the image capture device). The size of the punchout/viewing window may be changed (e.g., increased, decreased) based on the motion. For example, larger amount of motion may result in the size of the punchout being decreased while smaller amount of motion may result in the size of the punchout being increased. Such dynamic change in the size of the punchout may enable generation of a stabilized visual content that includes greater extent of the original visual than if a fixed-sized punchout/viewing window is used. The stabilized visual content may include different extents of the original visual content based on the motion of the image capture device during the capture duration. The size of the punchout/viewing window may be expressed in terms of field of view (field of view of visual content versus field of view of the viewing window), in terms of megapixels (megapixel of the visual content versus megapixel of the punchout), and/or in other terms.

FIG. 5A illustrates example images 512, 514 captured by an image capture device 502 from different rotational positions. The image 512 may be captured by the image capture device 502 while the image capture device 502 is leveled with respect to ground. The image 512 may include visual content depicting leveled scene within the field of view of the image capture device 502. The image 514 may be captured by the image capture device 502 while the image capture device 502 is rotated to the right. The image 514 may include visual content depicted tilted scene within the field of view of the image capture device 502.

FIG. 5B illustrates an example overlapping portion 522 between the images 512, 514 shown in FIG. 5A. The images 512, 514 may be captured by the image capture device 502 while pointed/centered at the same direction/point. Different rotations of the image capture device 502 during capture of the images 512, 514 may result in different portions of the scene being captured within the images 512, 514. The images 512, 514 may include pixels that represent same portions of the scene depicted within the images 512, 514. For example, the rotation of the image capture device 502 between capture of the images 512, 514 may cause the overlapping portion 522 of the images 512, 514 to include pixels that depict the same portions of the scene. The overlapping portion 522 may include the portions of the images 512, 514 that may be used to generate a stabilized view of the images 512, 514. That is, a punchout of the images 512, 514 from the overlapping portion 522 may be used to stabilize views of the images 512, 514.

FIG. 5C illustrates an example viewing window 532 within the overlapping portion 522 shown in FIG. 5B. The viewing window 532 may be located within the overlapping portion 522 to provide a stabilized view of the images 512, 514. For example, the images 512, 514 may represent adjacent video frames, and the viewing window 532 may be positioned within the field of view of the images 512, 514 as shown in FIG. 5C (within the overlapping portion 522) such that the punchout of the images 512, 514 shows visual content that appears to have been captured by the image capture device 502 without rotational motion.

Figure 5D:
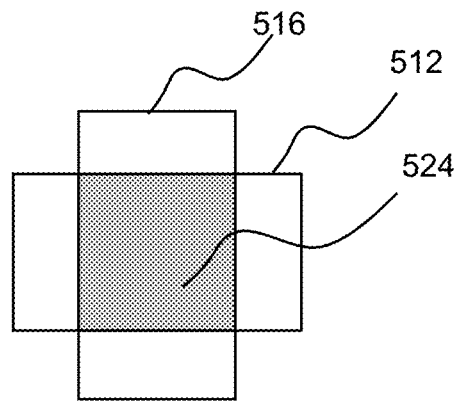
FIG. 5D illustrates an example overlapping portion between images.

FIG. 5D illustrates an example overlapping portion 524 between images 512, 516. As shown in FIG. 5A, the image 512 may be captured by the image capture device 502 while the image capture device 502 is leveled with respect to ground. The image 516 may be captured by the image capture device 502 while the image capture device 502 is rotated to the right by 90 degrees. The image 516 may include visual content depicted right-angle tilted scene within the field of view of the image capture device 502. The rotation of the image capture device 502 between capture of the images 512, 516 may cause the overlapping portion 524 of the images 512, 516 to include pixels that depict the same portions of the scene. The overlapping portion 524 may include the portions of the images 512, 516 that may be used to generate a stabilized view of the images 512, 516.

The amount of rotation of the image capture device between the original rotation (e.g., rotational position of the image capture device 502 during capture the initial image, first video frame) and the subsequent rotation (e.g., rotational position of the image capture device 502 during subsequent capture of another image, second video frame) may determine the size of the overlapping portion between the images. The size of the overlapping portion may determine the size of the viewing window that may be used to provide a stabilized punchout of the visual content within the images. Larger sizes of the overlapping portion may enable larger sizes of the viewing window and smaller sizes of the overlapping portion may require smaller sizes of the viewing window. That is, smaller sizes of the overlapping portion may limit the sizes of the viewing window. For example, the overlapping portion 522 (shown in FIGS. 5B, 5C) may be larger than the overlapping portion 524 (shown in FIG. 5D). The size of the viewing widow that may be used to stabilize the images 512, 514 may be larger than the size of the viewing window that may be used to stabilize the images 512, 516. That largest size (maximum size) of the viewing window that may be used stabilize the images 512, 516 may be smaller than the largest size (maximum size) of the viewing window that may be used stabilize the images 512, 514 because the overlapping portion 524 is smaller than the overlapping portion 522.

In some implementations, the changes in the maximum size of the viewing window that may be used to stabilize visual content based on rotation of the image capture device may be used to change the zoom level of the image capture device used to capture visual content. Use of buttons, switches, dials, and/or other features of the image capture device that needs to be engaged to change the zoom level of the image capture device may interfere with visual content capture. For example, a user engaging a button, a switch, and/or a dial to control the zoom level may take the user's attention away from the visual content being captured and/or may adversely impact the positioning of the image capture device (e.g., cause the image capture device to shake, tilt). Requiring such interaction by the user with the image capture device may take time. For example, when a user wishes to zoom-in and/or zoom-out, the user may need to locate the corresponding zoom button/switch/dial and engage the zoom button/switch/dial to change the zoom level.

Rather than requiring such interaction by the user with the image capture device, the zoom level of the image capture device may be changed based on rotation of the image capture device. For example, the zoom-level of the image capture device may correspond to the maximum size of the viewing window that may be used to stabilized visual content capture by the image capture device. The image capture device may monitor the initial rational position of the image capture device when a sequence of images (e.g., video frames, burst images) are being captured.

When the image capture device is rotated away from the initial rotational position, the zoom level of the image capture device may be increased (e.g., larger than 1×) with the extent of the visual content that is captured including and/or being smaller than the maximum size of the viewing window allowed based on the image capture device rotation. When the image capture device is rotated back towards the initial rotational position, the zoom level of the image capture device may be decreased (e.g., towards 1×) with the extent of the visual content that is captured including and/or being smaller than the maximum size of the viewing window allowed based on the image capture device rotation.

For example, referring to FIG. 5A, the image capture device 502 may be used to capture a video (visual content of video frames). The capture of the video may start with the image capture device 502 leveled to capture the image 512 (initial video frame). During the capture of the video, the image capture device 502 may be rotated to capture the image 514 (subsequent video frame). The rotation of the image capture device 502 from the initial rotational position may cause the zoom level of the image capture device 502 to be increased (with the extent of the visual content that is captured including and/or being smaller than the maximum size of the viewing window allowed based on the rotation of the image capture device 502). The rotation of the image capture device 502 back towards the initial rotational position may cause the zoom level of the image capture device 502 to be decreased.

Changing the zoom level of the image capture device based on the rotation of the image capture device may allow the user to capture visual content with different zoom levels without interfering with the visual content capture. Such changing of the zoom level may allow the user to change zoom level with changing how the image capture device is being held (e.g., not having to take a hand/fingers away from holding the image capture device to operate the zoom button). Such changing of the zoom level may allow the user to change zoom level by simply rotating the image capture device and may not require the user to have to find and/or engaged with zoom button/switch/dial to change the zoom level.

In some implementations, the visual content captured by the image capture device may be leveled as the function of progress through the progress length based on the rotational positions of the image capture device as the function of progress through the capture duration and/or other information. That is, the visual content captured by the image captured device may be rotated to compensate for rotation of the image capture device during the capture duration such that a view of the visual content includes depiction of leveled scene. For example, readings from the position sensor may be used to determine the direction of gravity when visual content is captured at different moments within the capture duration. The direction of gravity may be used to determine the amount of rotation that needs to be applied to the visual content to level the depiction within the visual content. For example, the visual content may be rotated so that the direction of gravity is pointed downwards.

Figure 5E:
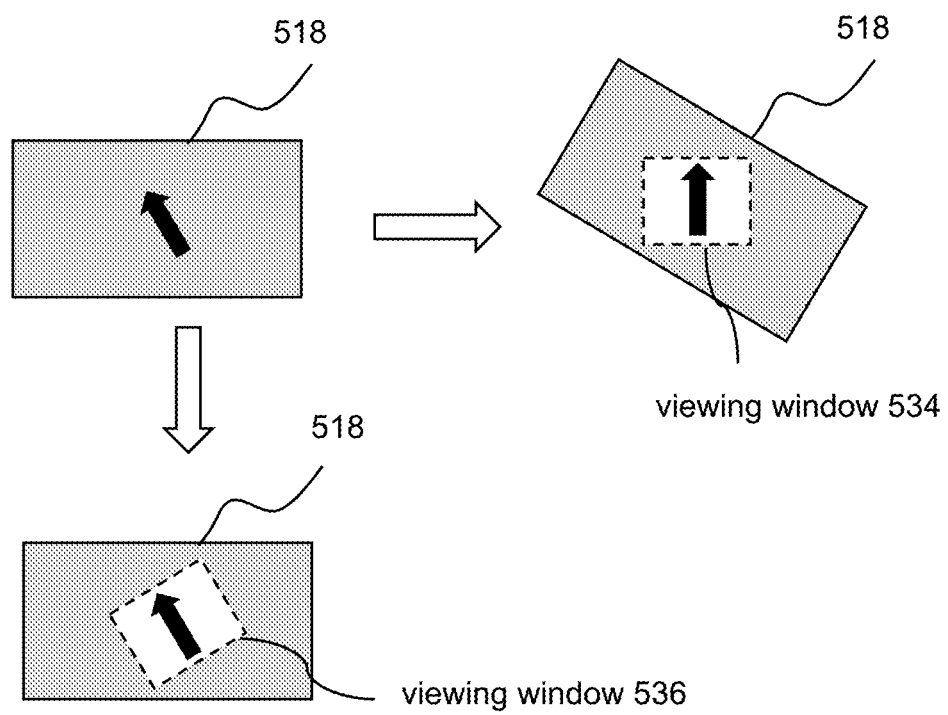
FIG. 5E illustrates example leveling of an image.

The rotation of the visual content may be effectuated through rotation of the visual content itself and/or through orientation of the viewing window with respect to the field of view of the visual content. For example, FIG. 5E illustrates example leveling of an image 518. The image 518 may be captured by an image capture device that is rotated to the right with respect to ground. For example, the image 518 may be captured by the image capture device 502 rotated to the right to capture the image 514 (shown in FIG. 5A). Such rotation of the image capture device may result in the visual content including tilted depiction of the capture scene. Viewing the image 518 may show upright objects within the scene to be depicted as being tilted to the left. The visual content of the image 518 may be rotated based on the rotational position of the image capture device during capture of the image 518 to provide leveled view of the scene. For example, the visual content of the image 518 may be rotated to the right so that upright objects within the scene appears upright. A viewing window 534 may be positioned in an upright manner within the leveled visual content of the image 518 to provide an upright punchout (leveled view) of the scene. As another example, a viewing window 536 may be position within unleveled visual content of the image 518. The viewing window 536 may be positioned in a tilted manner within the unleveled visual content of the image 518 to provide an upright punchout (leveled view) of the scene.

Referring back to FIG. 1, the processor 11 (or one or more components of the processor 11) may be configured to obtain information to facilitate stabilizing videos. Obtaining information may include one or more of accessing, acquiring, analyzing, determining, examining, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a position sensor) and/or one or more software components (e.g., software running on a computing device).

The video information component 102 may be configured to obtain video information and/or other information. The video information may define a video. For example, the video information component 102 may obtain video information defining a video while the video is being captured by an image capture device. The video information component 102 may obtain video information defining a video after the video has been captured and stored in memory (e.g., the electronic storage 13).

In some implementations, the video information component 102 may obtain video information based on user interaction with a user interface/application (e.g., video editing application, video player application), and/or other information. For example, a user interface/application may provide option(s) for a user to select one or more videos that are to be stabilized and/or played. The video information defining the video may be obtained based on the user's selection of the video content through the user interface/video application. Other selections of video are contemplated.

The video may include video content captured by an image capture device during a capture duration. The video content may have a progress length. The progress length of the video content may correspond to the capture duration. The progress length of the video content may be determined based on the capture duration. The progress length of the video content may be same as the capture duration, shorter than the capture duration (e.g., playback rate of the video content is faster than the capture rate of the video content), and/or longer than the capture duration (e.g., playback rate of the video content is slower than the capture rate of the video content).

The video content may include visual content captured at different moments within the capture duration. The visual content may be viewable as a function of progress through the progress length. The visual content may have a field of view, such as the field of view 305 shown in FIG. 3. The video content may include other content, such as audio content. Audio content may be captured during capture of the visual content (e.g., recording of sound captured with the images/video frames) and/or may be captured separately from the capture of the visual content (e.g., song/music provide accompaniment for the playback of the images/video frames, sound recorded before/after capture of the images/video frames).

The position information component 104 may be configured to obtain rotational position information of an image capture device and/or other information. The rotational position information may characterize rotational positions of the image capture device that captured the video as a function of progress through the capture duration for the video. The position information may describe and/or define the rotational positions of the image capture device at different moments within the capture duration and/or changes in rotational positions (motion) of the image capture device at different moments within the capture duration.

The position information component 104 may obtain rotational position information of the image capture device while the video is being captured by the image capture device. The position information component 104 may obtain rotational position information of the image capture device during generation of the position output signal by the position sensor. The position information component 104 may obtain rotational position information of the image capture device after the video/position information has been captured and stored in memory (e.g., the electronic storage 13). In some implementations, the position information component 104 may be configured to obtain other position information (e.g., translational position information).

The viewing window component 106 may be configured to determine a viewing window for the visual content as a function of progress through the progress length. One or more of shape, size, rotation, movement, and/or other characteristics of the viewing window may be determined for different moments within the progress length of the visual content. The viewing window may be determined based on the rotational positions of the image capture device as the function of progress through the capture duration and/or other information. One or more of shape, size, rotation, movement, and/or other characteristics of the viewing window may be determined for different moments within the progress length of the visual content based on the rotational positions of the image capture device during corresponding moments within the capture duration and/or other information.

A viewing window may be characterized by viewing directions, viewing sizes (e.g., viewing zoom, viewing magnification), viewing rotations, and/or other information. A viewing direction may define a direction of view for visual content. A viewing direction may define the angle/visual portion of the visual content at which the viewing window may be directed. Changes in the viewing direction as the function of progress through the progress length may effectuate movement (e.g., panning) of the viewing window within the field of view of the visual content.

A viewing size may define a size of the viewing window. A viewing size may define a size (e.g., size, magnification, viewing angle) of viewable extents of visual content. A viewing size may define the dimensions of the viewing window. In some implementations, a viewing size may define different shapes of the viewing window/viewable extents. For example, a viewing window may be shaped as a rectangle, a triangle, a circle, and/or other shapes. A viewing size may define different aspect ratios of the viewing window (e.g., 4:3 aspect ratio, 16:9 aspect ratio, 1:1 aspect ratio). Changes in the viewing size (sizes of the viewing window) as the function of progress through the progress length may simulate changes in zoom of the visual content. The viewing size may be increased to simulate decrease in zoom of the visual content. The viewing size may be decreased to simulate increase in zoom of the visual content.

A viewing rotation may define a rotation of the viewing window. A viewing rotation may define one or more rotations of the viewing window about one or more axis. For example, a viewing rotation may be defined based on rotation about an axis corresponding to a viewing direction (e.g., roll). Changes in the viewing rotation as the function of progress through the progress length may effectuate rotation of the viewing window within the field of view of the visual content. The rotation of the viewing window may compensate for rotation of the image capture device during capture duration.

A viewing window may define one or more extents of the visual content. A viewing window may define extents of the visual content to be included within stabilized visual content as the function of progress through the progress length. A viewing window may define which portions of the visual content are included within the stabilized visual content at different moment within the progress length. Inclusion of the extents of the visual content defined by the viewing window within the stabilized visual content may effectuate stabilization of the visual content.

A viewing window may be used to provide a punchout of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction.

The extents of the visual content viewable/extracted within the viewing window may be used to provide views of different spatial portions of the visual content.

For example, the visual content may include a field of view, and the punchout of the visual content may include the entire extent of the visual content (the visual content within the entire field of view) or one or more extents of the visual content (the visual content within one or more portions of the field of view). A viewing window may define extents of the visual content to be included within a punchout of the visual content as the function of progress through the progress length. A viewing window may correspond to the entire progress length or for one or more portions (e.g., portions including moments of interest) of the progress length. The punchout of the visual content may be presented on one or more displays, included in one or more videos, and/or otherwise used for presenting stabilized view of the visual content.

For example, determination of the viewing window may include determination of sizes of the viewing window as the function of progress through the progress length based on the rotational positions of the image capture device as the function of progress through the capture duration and/or other information. The sizes of the viewing window may be determined as described above with respect to FIGS. 5A-5D.

Figure 6A:
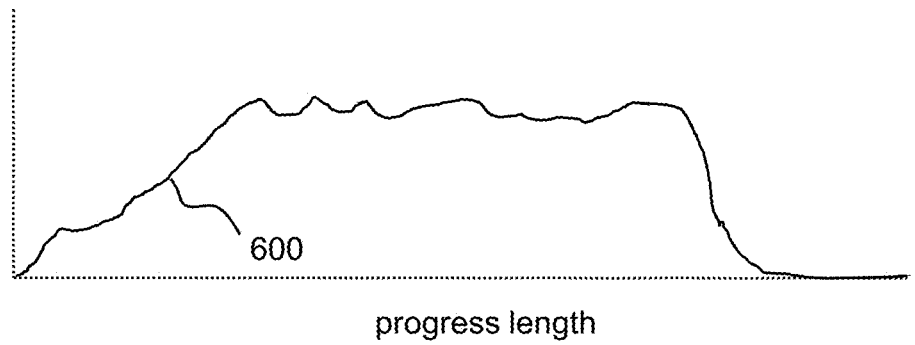
FIGS. 6A-6C illustrate example zoom curves.

In some implementations, the viewing window may be determined to have the sizes as the function of progress through the progress length. That is, the viewing window may have the sizes that are determined based on the rotational positions of the image capture device at different moments during the capture duration. For example, FIG. 6A illustrates an example zoom curve 600. The zoom curve 600 may include values as a function of the progress length, where the values reflect the amount of zoom of the visual content that is required to stabilize the visual content. The lowest zoom may correspond to no zooming of the visual content (1x zoom). No zooming of the visual content may result in the entirety of the captured visual content (using largest size of the viewing window) being included within the stabilized visual content. Higher zooming of the visual content may result in smaller spatial portions of the captured visual content (using smaller sizes of the viewing window) being included within the stabilized visual content. Using the zoom values of the zoom curve may result in pronounced (e.g., rapid, jittery) changes in zoom/viewing window size within the stabilized visual content. The zoom effect may be very pronounced within the stabilized visual content if the visual content was captured by an image capture device undergoing jittery/rapid rotations.

Figure 6B:
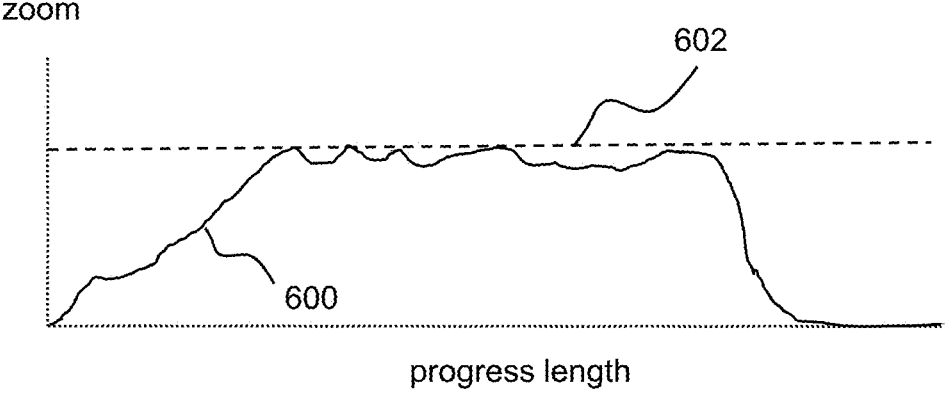

In some implementations, the viewing window may be determined to have a minimum of the sizes of the viewing window over the progress length. That is, the viewing window may have the smallest of the maximum viewing window size that are determined over the progress length based on the rotational positions of the image capture device at different moments during the capture duration. For example, FIG. 6B illustrates an example maximum zoom curve 602. The maximum zoom curve 602 may include a single value over the progress length, where the single value reflects the maximum cropping size of the visual content that allows stabilization the visual content over the entire progress length. The value of the maximum zoom curve 602 may be equal to or greater than the maximum value of the zoom curve 600. Using a single size of the viewing window over the progress length may result in the stabilized visual content not including zooming effects. Such a determination of the viewing size may be beneficial for visual content captured by an image capture device with right instances of rotation (e.g., video captured while spinning in the air, video captured by an image capture device inside a spinning ball). However, high quality visual content (high resolution image) may need to be captured by the image capture device to provide a pleasant punchout with a small viewing window size (narrow field of view). Moreover, visual content may be cropped more than needed to provide stabilization.

In some implementations, the viewing window may be determined to have smoothed changes in the sizes as the function of progress through the progress length. That is, the sizes that are determined based on the rotational positions of the image capture device may be smoothed to determine the sizes of the viewing window used for stabilization. Smoothing of the changes in the sizes as the function of progress through the progress length may include removing high frequencies changes in sizes. Smoothing of the changes in the sizes as the function of progress through the progress length may include insertion of one or more ramping changes in sizes. For example, based on the changes in sizes including jittery increase in size over a portion of the progress length, the jittery increase in size may be replaced with a smooth ramp that increases in size. Based on the changes in sizes including jittery decrease in size over a portion of the progress length, the jittery decrease in size may be replaced with a smooth ramp that decreases in size.

Figure 6C:
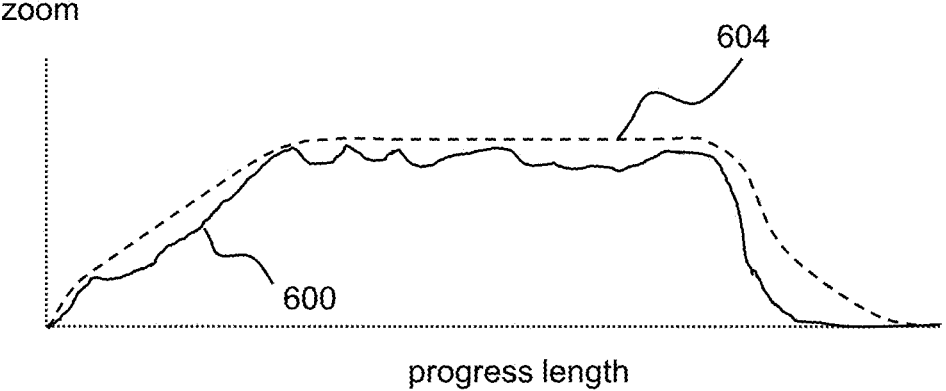

For example, FIG. 6C illustrates an example smoothed zoom curve 604. The smoothed zoom curve 604 may smoother changes in zoom than the zoom curve 600. The value of the smoothed zoom curve 604 may be equal to and/or greater than the maximum value of the zoom curve 600. Using a smoothed zoom curve may allow for rapid changes in zoom to be replaced with smoothed zooms, creating a more cinematic feel to the stabilized video than use of the zoom curve 600. Smoothing of the zoom curve 600 may include analysis of the changes in the sizes of the viewing window as defined by the zoom curve 600. Based on the analysis, the viewing window may be artificially made smaller and/or larger (e.g., artificially zoom-in and/or zoom-out) during moments that do not require the change in viewing window size to ramp-up and/or ramp-down to the needed viewing window size.

Use of different zoom curves may enable generation of stabilized visual content with different styles of zoom. For example, stabilized visual content with smoothed/dampened style of zoom may be generated based on use of a smooth zoom curve (e.g., the smoothed zoom curve 604). Stabilized visual content with maximum zoom/no change in zoom style may be generated based on use of a maximum zoom curve (e.g., the maximum zoom curve 602). Stabilized visual content with zoom that follows the rotation of the image capture device may be generated based on the use of a non-modified zoom curve (the zoom curve 600).

Use of different zoom curves/styles may be selected by the user and/or automatically selected. For example, a particular zoom curve/style may be selected for use in generating stabilizing visual content based on user interaction with a user interface/application (e.g., video editing application, video player application), and/or other information. For instance, a user interface/application may provide option(s) for a user to select one or more of the zoom curves/styles to be used for visual content stabilization. As another example, a particular zoom curve/style may be selected for use in generating stabilizing visual content based on the rotational positions of the image capture device as a function of progress through the capture duration, the sizes of the viewing window determined as the function of progress through the progress length based on the rotational positions of the image capture device, on the content captured within the visual content (e.g., activity identification, subject identification, face identification, emotion identification), and/or other information. Other selections of zoom curves/styles are contemplated.

In some implementations, determination of the viewing window may include determination of shape, rotation, movement, and/or other characteristics of the viewing window as the function of progress through the progress length. For example, the shape of the viewing window may be selected as being rectangular or circular and/or to have a particular aspect ratio (e.g., 4:3 aspect ratio, 16:9 aspect ratio, 1:1 aspect ratio) based on user selection, the rotational positions of the image capture device, the content captured within the visual content (e.g., activity identification, subject identification, face identification, emotion identification), and/or other information. For instance, a particular aspect ratio may be selected to include depiction of one or more particular things (e.g., a person, an activity) within the viewing window, a particular aspect ratio may be selected to frame depiction of one or more particular things (e.g., a face) in a particular manner within the viewing window, and/or a particular aspect ratio may be selected to maximize the extent of the visual content included within the viewing window. In some implantations, the viewing window may be positioned to include one or more particular depictions (e.g., faces, smiles) within the viewing window.

In some implementations, determination of the viewing window may include determination of maximum extents of the visual content for placement of the viewing window as the function of progress through the progress length based on the rotational positions of the image capture device as the function of progress through the capture duration and/or other information. That is, the maximum extents of the visual content that may be stabilized may be determined for different moments within the progress length of the visual content. The sizes of the viewing window may be equal to or smaller than the maximum extents of the visual content that may be stabilized. Using smaller sizes of the viewing window may allow for the viewing window to movement within the maximum extents of the visual content.

Movement of the viewing window within the maximum extents of the visual content may generate one or more panning views. For example, referring to FIG. 5C, the viewing window 532 may be smaller than the overlapping portion 522. The viewing window 532 may move within the overlapping portion 522 to provide punchout of different spatial extents of different image (e.g., for a sequence of video frames having the overlapping portion 522). The border of the overlapping portion 522 may form the boundaries within which the viewing window 532 may move. For example, the viewing window 532 may move along one or more of the borders of the overlapping portion 522 and/or move across the overlapping portion 522 without touching the borders. Such movement of the viewing window may simulate panning of the image capture device in visual content capture (e.g., panning up and down, side to side).

In some implementation, the viewing window component 106 may be further configured to rotate the visual content to level the visual content as the function of progress through the progress length based on the rotational positions of the image capture device as the function of progress through the capture duration and/or other information. Rotation of the visual content may be determined for different moments within the progress length of the visual content. The visual content may be rotated to compensate for rotation of the image capture device during the capture duration such that a view of the visual content includes depiction of leveled scene.

In some implementations, the direction of gravity for visual content capture at different may be used to determine the amount of rotation that needs to be applied to the visual content to level the depiction within the visual content. For example, the visual content may be rotated so that the direction of gravity is pointed downwards. The rotation of the visual content may be effectuated through rotation of the visual content itself and/or through orientation of the viewing window with respect to the field of view of the visual content. The visual content may be rotated to level the visual content as described above with respect to FIG. E.

The generation component 108 may be configured to generate stabilize visual content based on one or more viewing window and/or other information. The stabilized visual content may include a punchout of the extent(s) of the visual content within the viewing window(s). Stabilized visual content may be generated to provide a smoother view of the visual content. Stabilization may include using smaller portions/extents of the visual content to provide a punchout view of the visual content that creates a more stable view than when viewing the entirety of the visual content. Generation of stabilized visual content may include using smaller visual portions of the captured visual content (e.g., smaller visual portions of images/video frames within the viewing window) to provide a punchout view of the captured visual content. The stabilized visual content may provide a more stable view of the visual content than when the entirety of the visual content is presented.

In some implementations, stabilized visual content may be generated as images/video frames including extent(s) of the visual content within the viewing window(s). Stabilized visual content may be generated as outputs of portions of the visual captured by the image capture device, with the outputted portions including extent(s) of the visual content within the viewing window(s). Inclusion of the extent(s) of the visual content within the viewing windows in video may effectuate stabilization of the visual content via selective cropping. The portions of the visual content that are cropped for stabilization may depend on the rotational positions of the image capture device during the capture duration and/or other information.

In some implementations, the stabilized visual content may be generated based on the viewing window having the sizes as the function of progress through the progress length and/or other information. That is, the viewing window for generating the stabilized visual content may have the sizes that are determined based on the rotational positions of the image capture device at different moments during the capture duration. For example, the stabilized visual content may be generated based on the zoom curve 600 shown in FIG. 6A.

In some implementations, the stabilized visual content may be generated based on the viewing window having the minimum of the sizes of the viewing window over the progress length and/or other information. That is, the viewing window for generating the stabilized visual content may have the smallest of the maximum viewing window size that are determined over the progress length based on the rotational positions of the image capture device at different moments during the capture duration. For example, the stabilized visual content may be generated based on the maximum zoom curve 602 shown in FIG. 6B.

In some implementations, the stabilized visual content may be generated based on the viewing window having smoothed changes in the sizes as the function of progress through the progress length and/or other information. That is, the viewing window for generating the stabilized visual content may have sizes that are determined smoothing of sizes determined based on the rotational positions of the image capture device at different moments during the capture duration. For example, the stabilized visual content may be generated based on the smoothed zoom curve 604 shown in FIG. 6C.

In some implementations, the stabilized visual content may be generated as an encoded version/copy of the stabilized visual content (e.g., encoded video file) and/or a director track that defines the extents of the visual content to be used during playback. For example, the stabilized visual content may be generated as video frames in a video file, and the video file may be opened in a video player for presentation of the stabilized visual content. The stabilized visual content may be generated as instructions to render the visual content for presentation. The instructions (e.g., director track) may which define visual portions of the visual content (images, video frames) should be included within the presentation of the video content. The instructions may include information on the location, size, shape, and/or rotation of the punchout of images/video frames to be used to as a function progress through the progress length of the visual content to provide a stabilized view of the images/video frames. A video player may use the instructions to retrieve the relevant visual portions of the images/video frames when the visual content is opened and/or is to be presented.

The generation component 108 may be configured effectuate storage of the stabilized visual content and/or other information in one or more storage media. For example, the stabilized visual content (e.g., video file, director track) may be stored in the electronic storage 13, remote storage locations (storage media located at/accessible through a server), and/or other locations. In some implementations, the generation component 108 may effectuate storage of the stabilized visual content through one or more intermediary devices. For example, the processor 11 may be located within a computing device without a connection to the storage device (e.g., the computing device lacks WiFi/cellular connection to the storage device). The generation component 108 may effectuate storage of the stabilized visual content through another device that has the necessary connection (e.g., the computing device using a WiFi/cellular connection of a paired mobile device, such as a smartphone, tablet, laptop, to store information in one or more storage media). Other storage locations for and storage of the stabilized visual content are contemplated.

In some implementations, the processor 11 may represent multiple processors, and at least one of the processors may be a remote processor located remotely from the housing of the image capture device (e.g., the image capture device 302). One or more of the functionalities of the components 102, 104, 106, 108 may be performed by the image capture device 302 (e.g., by the processor 310) and/or by a remote processor. For example, viewing window determination (functionalities of the viewing window component 106) and/or stabilized visual content generation (functionality of the generation component 108) may be performed by the remote processor during and/or post capture of the visual content by the image capture device. As another example, stabilized visual content generation may be performed by the processor 310 during capture of the visual content to provide the stabilized visual content during capture of the visual content.

In some implementations, a representation of the viewing window may be presented. For example, an image capture device capturing the visual content may determine the size, location, and/or the rotation of the viewing window during capture of the visual content and may display an outline of the viewing window within a preview of the visual content being captured. Such a presentation may allow a user to have a better understanding of how much of the visual content that is being captured is stabilizable and/or to modify use of the image capture device to capture visual content by using the viewing window representation as a guide (e.g., using the outline of the viewing window overlaid over preview of the visual content being captured to center the subject of capture within the viewing window).

In some implementations, the visual content may not be stabilized in/near real time. For example, the image capture device may not have sufficient resource to apply the stabilization technique described herein in real-time and/or may be devoting its resources to other tasks. The stabilization of the visual content may be performed by the image capture device once sufficient resource becomes available. The stabilization of the visual content may be performed by the remote processor. For example, the remote processor may be one or more processors of a remote computing device (e.g., mobile device, desktop, server), and the remote processor may receive video information and the rotational position information captured/generated by the image capture device. The remote computing device (software running on the remote computing device) may apply the stabilization technique described herein post capture of the visual content by the image capture device. The post-capture stabilization of the visual content may be performed by the remote processor responsive to reception of the video information and rotational position information, responsive to user/system command to stabilize the visual content, responsive to the visual content being opened for playback, and/or responsive to other conditions.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
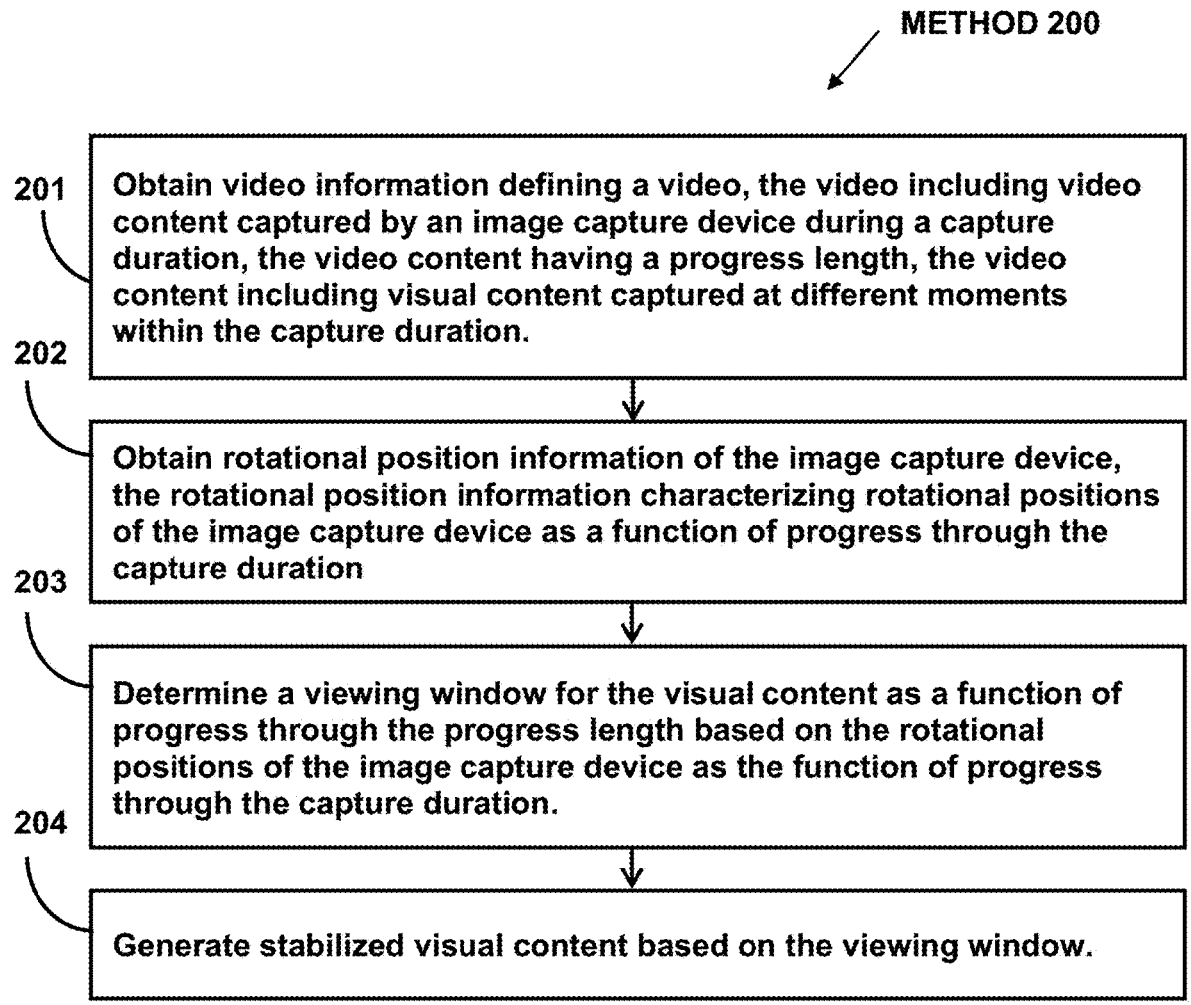
FIG. 2 illustrates an example method for stabilizing videos.

FIG. 2 illustrates method 200 for stabilizing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may include video content captured by an image capture device during a capture duration. The video content may have a progress length. The video content may include visual content captured at different moments within the capture duration. The visual content may be viewable as a function of progress through the progress length. The visual content may have a field of view. In some implementation, operation 201 may be performed by a processor component the same as or similar to the video information component 102 (Shown in FIG. 1 and described herein).

At operation 202, rotational position information of the image capture device may be obtained. The rotational position information may characterize rotational positions of the image capture device as a function of progress through the capture duration. In some implementation, operation 202 may be performed by a processor component the same as or similar to the position information component 104 (Shown in FIG. 1 and described herein).

At operation 203, a viewing window for the visual content as a function of progress through the progress length may be determined based on the rotational positions of the image capture device as the function of progress through the capture duration and/or other information. The viewing window may define extents of the visual content to be included within stabilized visual content as the function of progress through the progress length. Determination of the viewing window may include determination of sizes of the viewing window as the function of progress through the progress length based on the rotational positions of the image capture device as the function of progress through the capture duration and/or other information. In some implementation, operation 203 may be performed by a processor component the same as or similar to the viewing window component 106 (Shown in FIG. 1 and described herein).

At operation 204, the stabilized visual content may be generated based on the viewing window and/or other information. The stabilized visual content may include a punchout of the extents of the visual content within the viewing window. In some implementation, operation 204 may be performed by a processor component the same as or similar to the generation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for stabilizing videos, the system comprising: one or more physical processors configured by machine-readable instructions to:
    obtain video information defining a video, the video including visual content captured by an image capture device during a capture duration, the visual content having a progress length, the visual content having a field of view;
    obtain rotational position information of the image capture device, the rotational position information characterizing rotational positions of the image capture device as a function of progress through the capture duration;
    determine placement of a viewing window within the field of view of the visual content as a function of progress through the progress length based on the rotational positions of the image capture device as the function of progress through the capture duration for stabilization of the visual content to compensate for motion of the image capture device during the capture duration and for leveling of the visual content to compensate for tilt of the image capture device during the capture duration, the viewing window defining extents of the visual content to be included within stabilized and leveled visual content as the function of progress through the progress length, wherein determination of the placement of the viewing window includes determination of shape of the viewing window; and
    generate the stabilized and leveled visual content to include the extents of the visual content within the viewing window.

2. The system of claim 1, wherein the determination of the placement of the viewing window further includes determination of size of the viewing window.

3. The system of claim 2, wherein the size of the viewing window increases or decreases as the function of progress through the progress length.

4. The system of claim 1, wherein the shape of the viewing window is determined based on the rotational positions of the image capture device.

5. The system of claim 1, wherein the shape of the viewing window is determined based on user selection.

6. The system of claim 1, wherein the shape of the viewing window is determined based on content captured within the visual content.

7. The system of claim 6, wherein determination of the shape of the viewing window based on the content captured within the visual content includes determination of the shape of the viewing window based on identification of activity, subject, face, or emotion captured within the visual content.

8. The system of claim 1, wherein the determination of the shape of the viewing window includes determination of aspect ratio of the viewing window.

9. The system of claim 1, wherein the leveling of the visual content to compensate for the tilt of the image capture device during the capture duration is performed based on direction of gravity.

10. A method for stabilizing videos, the method performed by a computing system including one or more processors, the method comprising:
    obtaining, by the computing system, video information defining a video, the video including visual content captured by an image capture device during a capture duration, the visual content having a progress length, the visual content having a field of view;
    obtaining, by the computing system, rotational position information of the image capture device, the rotational position information characterizing rotational positions of the image capture device as a function of progress through the capture duration;
    determining, by the computing system, placement of a viewing window within the field of view of the visual content as a function of progress through the progress length based on the rotational positions of the image capture device as the function of progress through the capture duration for stabilization of the visual content to compensate for motion of the image capture device during the capture duration and for leveling of the visual content to compensate for tilt of the image capture device during the capture duration, the viewing window defining extents of the visual content to be included within stabilized and leveled visual content as the function of progress through the progress length, wherein determination of the placement of the viewing window includes determination of shape of the viewing window; and
    generating, by the computing system, the stabilized and leveled visual content to include the extents of the visual content within the viewing window.

11. The method of claim 10, wherein determining the placement the viewing window further includes determining size of the viewing window.

12. The method of claim 11, wherein the size of the viewing window increases or decreases as the function of progress through the progress length.

13. The method of claim 10, wherein the shape of the viewing window is determined based on the rotational positions of the image capture device.

14. The method of claim 10, wherein the shape of the viewing window is determined based on user selection.

15. The method of claim 10, wherein the shape of the viewing window is determined based on content captured within the visual content.

16. The method of claim 15, wherein determining the shape of the viewing window based on the content captured within the visual content includes determining the shape of the viewing window based on identification of activity, subject, face, or emotion captured within the visual content.

17. The method of claim 10, wherein determining the shape of the viewing window includes determining aspect ratio of the viewing window.

18. The method of claim 10, wherein the leveling of the visual content to compensate for the tilt of the image capture device during the capture duration is performed based on direction of gravity.

19. A system for stabilizing videos, the system comprising: one or more physical processors configured by machine-readable instructions to:
   obtain video information defining a video, the video including visual content captured by an image capture device during a capture duration, the visual content having a progress length, the visual content having a field of view;
   obtain rotational position information of the image capture device, the rotational position information characterizing rotational positions of the image capture device as a function of progress through the capture duration;
   determine placement of a viewing window within the field of view of the visual content as a function of progress through the progress length based on the rotational positions of the image capture device as the function of progress through the capture duration for stabilization of the visual content to compensate for motion of the image capture device during the capture duration and for leveling of the visual content to compensate for tilt of the image capture device during the capture duration, the viewing window defining extents of the visual content to be included within stabilized and leveled visual content as the function of progress through the progress length, wherein determination of the placement of the viewing window includes determination of shape of the viewing window based on the rotational positions of the image capture device; and
   generate the stabilized and leveled visual content to include the extents of the visual content within the viewng window.

20. The system of claim 19, wherein the leveling of the visual content to compensate for the tilt of the image capture device during the capture duration is performed based on direction of gravity.

* * * * *

UNITED STATES PATENT AND TRADEMARK OFFICE
CERTIFICATE OF CORRECTION

PATENT NO. : 11,622,076 B2
APPLICATION NO. : 17/721065
DATED : April 4, 2023
INVENTOR(S) : Daryl Stimm et al.

It is certified that error appears in the above-identified patent and that said Letters Patent is hereby corrected as shown below:

In the Claims

In Claim 19, Column 26, Lines 15-16, please delete "view ng" and insert --viewing--, therefor.

Signed and Sealed this
Ninth Day of May, 2023

Katherine Kelly Vidal
*Director of the United States Patent and Trademark Office*